United States Patent [19]

Gerlitz

[11] 4,281,686

[45] Aug. 4, 1981

[54] THREE WAY BUTTERFLY VALVE

[76] Inventor: Gordon R. Gerlitz, 3901 Hammersberg Rd., Flint, Mich. 48507

[21] Appl. No.: 96,672

[22] Filed: Nov. 23, 1979

[51] Int. Cl.³ .................................................. F16K 5/00
[52] U.S. Cl. ................................ 137/887; 137/625.46; 137/876
[58] Field of Search .................. 137/625.46, 887, 876, 137/875; 251/305; 123/41.09

[56] References Cited

U.S. PATENT DOCUMENTS

| | | | |
|---|---|---|---|
| 929,944 | 8/1909 | Hawley et al. | 137/875 |
| 2,395,997 | 3/1946 | Eckel | 137/625.46 |
| 3,228,653 | 1/1966 | Trimmer | 251/306 |
| 3,373,771 | 3/1968 | Boyen | 137/625.46 |
| 3,888,458 | 6/1975 | Bubniak et al. | 137/625.28 |
| 3,966,119 | 6/1976 | Harter et al. | 137/876 X |
| 3,995,446 | 12/1976 | Eubank | 62/325 |
| 4,156,439 | 5/1979 | Jeffries et al. | 137/625.46 |

FOREIGN PATENT DOCUMENTS 4077 11/1904 France ...................................... 137/876

Primary Examiner—William E. Tapolcai, Jr.
Attorney, Agent, or Firm—Remy J. VanOphem

[57] ABSTRACT

A motor means controlled three way butterfly valve is disclosed for regulating the flow of liquids, as in internal combustion engine cooling system and passenger compartment heating and air conditioning systems. The valve plate includes two flat parallel surfaces which engage two corresponding flat parallel surfaces formed on the cylindrical passage in the valve body to reduce valve plate binding or sticking against the inner surface of the flow passage when the valve plate is rotated.

25 Claims, 7 Drawing Figures

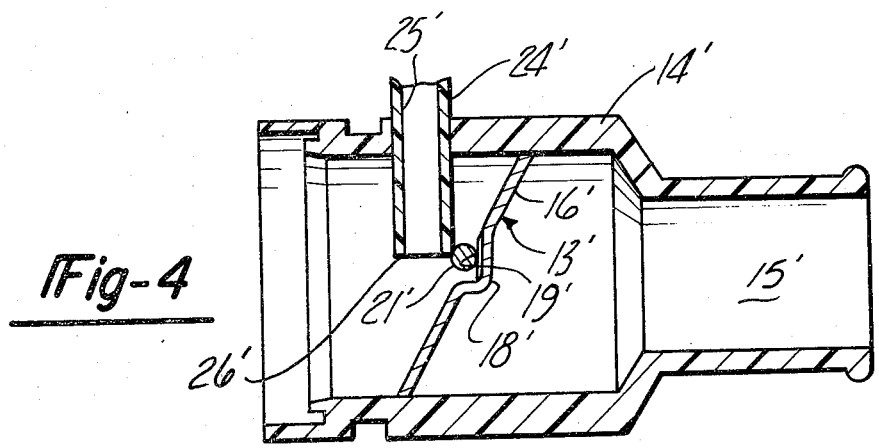
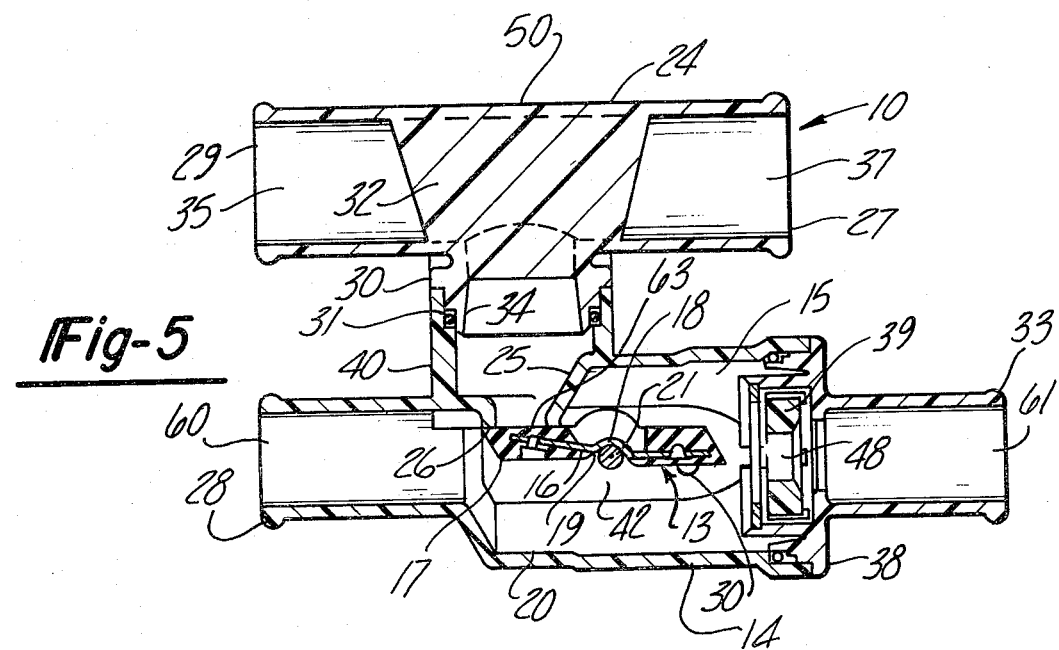

THREE WAY BUTTERFLY VALVE

BACKGROUND OF THE INVENTION

1. Field of the Invention

This invention relates to butterfly valves and particularly to butterfly valves as utilized for controlling the flow of fluids through three ports.

2. Description of the Prior Art

An earlier filed patent application Ser. No. 959,643, filed Nov. 13, 1978, now U.S. Pat. No. 4,202,398 discloses a three way butterfly valve which eliminates the need for a liquid bypass port in the block of an internal combustion engine. In addition, the three way butterfly valve closes tightly with virtually no leakage through the main passage when the automobile air conditioning system is set in the maximum air conditioning mode. The three way valve also incorporates a fluid flow restrictor to protect the automobile heater core from excessive liquid pressure.

A disadvantage of the above described valve is that the resilient seal around the periphery of the valve plate has a tendency to bind or stick against the inner surface of the flow passageway when rotated. A further disadvantage of the above described valve is the need to position the valve plate angularly and radially before attaching the valve plate to the engaging pin in the flow passageway.

SUMMARY OF THE INVENTION

The present invention relates to improvements in the aforedescribed three way butterfly valve. One improvement in the design is to eliminate sticking or binding against the inner surface of the flow passageway when rotated. This is accomplished by incorporating two flat surfaces within the cylindrical bore of the flow passageway of the valve body. In addition, two flat surfaces are incorporated on the outer periphery of the valve plate so that the valve plate is piloted within the cylindrical bore along the two flat surfaces for easy attachment to the engaging pin.

In accordance with the invention, a three way butterfly fluid flow valve assembly comprises a valve body having a portion formed with a cylindrical bore interposed a fluid inlet and fluid outlet. A bypass passageway is mounted to the side of the valve body and projects internally approximately midway into the cylindrical bore.

Two flat surfaces are formed on the cylindrical bore in spaced relationship downstream of the bypass passageway. A pin is positioned transversely through the two flat surfaces in the cylindrical bore. A disc shaped valve plate having two flat surfaces on its outer periphery and formed with a diametrical flat position extending through the two flat surfaces on the outer periphery of the disc, is mounted on the pin for rotation about the pin.

In assembly, the valve plate is inserted into the valve body. The valve plate is piloted within the valve body by virtue of the mutual flat parallel surfaces on the valve plate and cylindrical bore. The valve plate is then positioned in the cylindrical bore with the diametrically extending portion of the valve plate engaging the pin. The valve plate is then fastened to the pin as by welding. Downstream of the valve plate is located a flexible orifice disc flow control valve which reduces the pressure at the valve outlet. The valve plate is rotated from a first position closing off the flow of fluid through the cylindrical bore to permit flow only through the bypass passageway, to a second position in which the valve plate covers the bypass passageway to permit flow through the cylindrical bore while restricting the flow through the bypass passageway.

Accordingly, the objects of this invention are to provide a three way butterfly valve which minimizes the problem of valve plate binding against the periphery of the cylindrical passage when the valve plate is rotated, minimizes the problem of fluid leakage when the valve plate is in sealing engagement with the periphery of the cylindrical passage and provides a bypass passageway for the fluid when the valve plate closes off the flow of fluid through the cylindrical passage.

BRIEF DESCRIPTION OF THE DRAWINGS

FIG. 4 is a partial longitudinal sectional view of a modified form of the valve assembly.

FIG. 5 is a longitudinal sectional view of the valve assembly with the valve plate restricting flow through the bypass port.

DETAILED DESCRIPTION OF THE DRAWINGS

Figure 1:
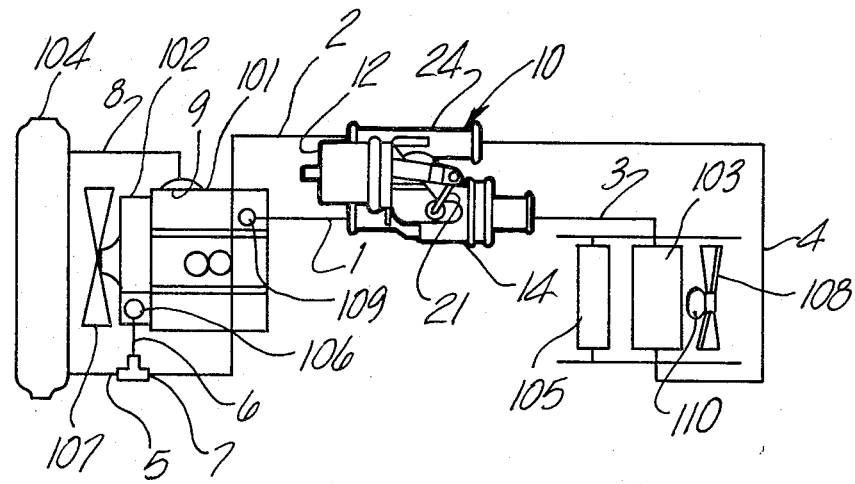
FIG. 1 is a side elevational view of a three way butterfly valve according to the present invention showing its use in an internal combustion vehicle environment.

Referring to FIG. 1, the invention is shown in connection with an automotive heating system coupled with an air conditioning system. The automobile engine is indicated as 101, pump means as 102, the radiator as 104, the passenger compartment heater core as 103, the passenger compartment air conditioning evaporator core as 105, the engine cooling fan as 107, the heater core and evaporator core blower fan as 108, the blower fan motor means as 110 and the pump means inlet port as 106. The above described components follow the conventional design for liquid cooling of internal combustion engines. The present invention contemplates a modification of the conventional method of routing the liquid as when the engine thermostat 9 is closed during the warm-up mode of the engine.

Normally, it is common to provide an external bypass port with hoses and clamps for connecting the liquid cooling passages in the engine block with the intake to the pump means. This external bypass permits the circulation of the liquid from the pump means through the engine block liquid cooling passages and return the flow of the liquid to the pump means through the bypass when the engine thermostat 9 is closed.

Figure 2:
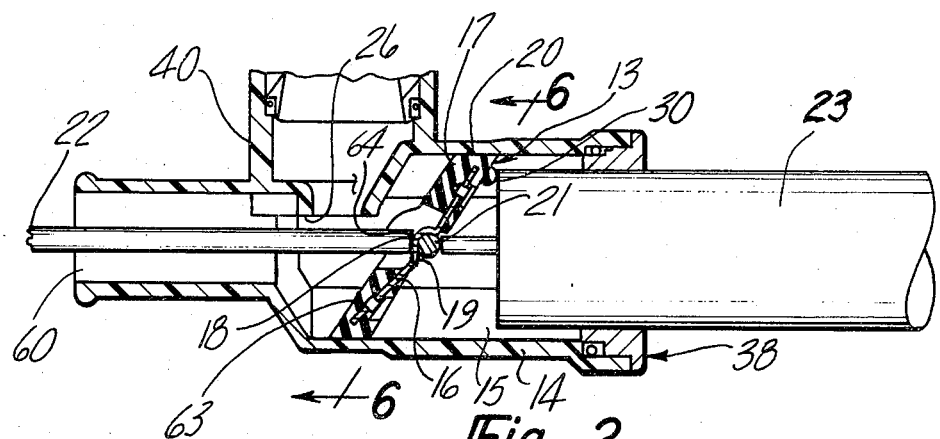
FIG. 2 is a partial longitudinal sectional view of the valve body assembly with the valve plate shown in position with the maximum air condition mode in operation.

The present invention eliminates the need for the aforesaid external bypass passage and routes the liquid from the internal liquid cooling passages in the engine block through port 109 into line 1 and then into the butterfly valve assembly 10. The butterfly valve assembly 10 incorporates a valve body 14 and a bypass port tee 24 mounted to the valve body. The butterfly valve assembly 10 further includes motor means 12, i.e. vacuum control motor, electric motor, etc. to move a valve plate 13 (not shown) and thereby control the flow of liquid through the butterfly valve assembly. During the warm-up mode of the internal combustion engine, liquid is permitted to flow through the butterfly valve assembly 24 in either of two directions, depending on the position of the valve plate 13. In one position of the valve plate 13, as shown in FIG. 2, the liquid flowing into the butterfly valve assembly 24 can be made to flow into the bypass port tee 24, then into line 2, then into tee 7, then into line 6, and thence directly into the inlet port 106 of the pump means 102 (as shown in FIG. 1). In the other position of the valve plate 13 (illustrated in FIG. 5), the liquid is made to flow through the butterfly valve assembly 10, into line 3 and then into the heater core 103 (as shown in FIG. 1). From the heater core 103, the liquid is made to flow into line 4, into the bypass port tee 24, into line 2, into tee 7, then into line 6 and thence directly into the inlet port 106 of the pump means 102. Thus, in either position of the valve plate 13, the liquid from the engine block is circulated back to the pump means 102. When, however, the engine thermostat 9 is closed and the valve plate 13 is in the first position, that is when the valve plate 13 closes off the flow through the valve body, the liquid flows through the bypass passageway 40, then into the bypass port tee 24, then into line 2, then into tee 7, then into line 6 and thence directly into the inlet port 106 of the pump means 102. In this last described mode, the butterfly valve assembly 10 permits the rapid and uniform heating of the engine block and associated hardware by rapidly recirculating the liquid through the engine cooling passages. When the engine thermostat 9 opens, the liquid is permitted to flow in its conventional manner, that is, into line 8, then into the radiator 104, then into line 5, then into tee 7, then into line 6 and thence into the inlet port 106 of the pump means 102. A limited amount of liquid is permitted to flow out of port 109 into the butterfly valve assembly 10 when the thermostat 9 is in the open position.

Figure 6:
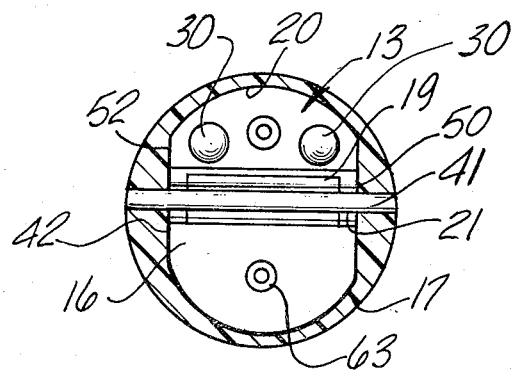
FIG. 6 is an opposite end view of the valve of the plate shown in FIG. 3.

As shown in FIG. 5, the butterfly valve assembly 10 includes a valve body 14 having a passage 15 that is generally cylindrical except for two flat parallel surfaces 41, 42 (as illustrated in FIG. 6) which are formed or moulded in the passage 15.

The two flat surfaces 41, 42 are formed on the passage 15 in spaced relationship to a bypass leg 40 formed on the side of the valve body 14 (as shown in FIG. 5). The bypass leg 40 has an internally formed passage 25 which is formed, drilled, or moulded therethrough and terminates on one end of the passage 40 with a face seat 26. The face seat 26 is substantially parallel to the axis of the passage 15. On the other end, the bypass leg 40 terminates such as to interconnect with the short leg 30 of the bypass passage tee 24. Interposed the short leg 30 and the bypass leg 40 is a ring seal 31. The short leg 30 of the bypass passage tee 24 maybe fastened to the bypass leg 40 by brazing, soldering, ultrasonic, welding or any other suitable method. The short leg 30 has a passage 34 formed therein which connects with passage 25 in the bypass leg 40. The cross member 50 of the bypass passage tee 24 includes an outlet 29 with an internal passage 35, an inlet 27 with an internal passage 37 and are interconnected. A rib 32 is formed in the passages 35, 37 of the cross member 50 and into the passage 34 of the short leg 30. The passage 34 is interconnected with the passage 35 and passage 37. In the preferred embodiment, the rib 32 aids in the joining of the bypass passage tee 24 to the valve body 14 when an ultrasonic welding process is used. The valve body 14, bypass passage tee 24 and the bypass leg 40 may be machined, cast or moulded from metal, plastic or any other suitable material.

As shown in FIG. 5, the valve plate 13 has on its upstream lower half portion, a valve seat seal 63. The seal 63 is located on the valve plate 13 so as to be in contact with the face seat 26 of the bypass leg 40 when the valve plate 13 is in a substantially parallel position with respect to the axis of the passage 15. An inlet port 28 is moulded, formed or cast to the valve body 14 upstream of the valve plate 13 and bypass leg 40. A passage 60 in the inlet port 28 connects with passage 15 in the valve body 14. An outlet port 33 is formed, moulded or cast to an outlet end plate 38 which is made from metal or any other suitable material such as plastic. The outlet port 33 has a passage 61 which connects with passage 15 in the valve body. The outlet end plate 38 is fastened to the valve body 14 by any convenient means such as by welding, brazing or soldering. A resilient flow control orifice member 39 is attached to the outlet end plate such that it is downstream of the valve plate 13 but upstream of the outlet port 33.

Figure 3:
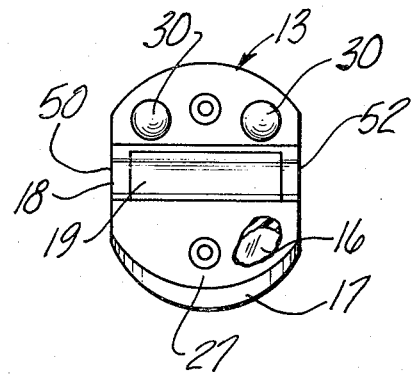
FIG. 3 is an end view of the valve plate.

As shown in FIG. 3, the valve plate 13 comprises a metal disc 16 which in the preferred embodiment is partially surrounded by a resilient body 17 about the periphery of the disc 16. The valve plate 13 further has two flat parallel surfaces 50, 52 on its outer periphery. The disc 16 is further formed with a diametrically extending central portion 18 having a flat planar portion 19 that is at an acute angle to the general plane of the disc 16. The flat planar portion 19 further extends perpendicular to the two flat parallel surfaces 50, 52 on the outer periphery of the valve body 13.

In FIG. 5, the position of the planar portion 19 of the disc 16 is such that when the resilient body 17 of the valve plate 13 is in sealing engagement with the inner surface 20 of the passage 15 (shown in FIG. 2), the two flat surfaces 50, 52 on the valve plate 13 are in sealing engagement with the respective flat surfaces 41, 42 in the passage 15 as shown in FIG. 6. In this position, the planar portion 19 of the disc 16 extends radially of the passage 15 and perpendicular to the axis of said passage and the valve plate 13 is at an acute angle to the axis of the passage 15 as shown in FIG. 2.

The resilient flow control orifice member 39 is sized to restrict the flow of liquid through the outlet port to control the liquid pressure through the outlet port thereby regulating the liquid pressure that acts on the components downstream of the butterfly valve assembly 10 as, for example, to protect the heater core of an automotive heating system from excessive pressures generated by the pump means 102 which may cause the heater core to leak. The resilient flow control member 39 has an additional feature which has been found to be desirable in certain applications such as, for example, an automotive heating system. It has the ability at high fluid pressure conditions to deform and thus decrease the flow passage 48 to permit a substantially constant liquid throughput as compared to the flow throughput normally experienced at lower pressures. In other applications, it may be found necessary to have a fixed flow control orifice for all liquid pressure ranges and, in some applications, where the maximum flow through the outlet port is desired and pressure considerations are not important, it may be found desrable to eliminate the flow control orifice.

In assembling the valve plate 13 to the valve body 14, as shown in FIG. 2, the valve plate 13 is inserted into the passage 15 of the valve body 14. Because of the flat surfaces 50, 52 on the valve plate and the flat surfaces 41, 42 on the passage 15, the valve plate is piloted within the valve body 14 until it is moved past the general location for receiving the pivot pin. The pivot pin 21 is positioned in the valve body 14 so as to extend generally diametrically of the passage 15 and in spaced relationship to the bypass passage face seat 26. Next, as the valve plate 13 is pushed against the pin 21 by the electrode 22, the pin engages the planar portion 19 of the disc 16. Prior to insertion of the valve plate into the valve body, the plate is oriented so that valve seat seal portion 63 is located in a predetermined position with respect to the valve seat 26. The valve seat seal 63, in the lower half portion of the valve plate 13, faces upstream of the valve body 14. In this position, the valve plate 13, together with the disc 16 is pressed by the blunt tip 64 portion of the electrode 22 so that the top half of the resilient body 17 of the valve plate 13 is in sealing engagement with the inner surface 20 of the passage 15. At the same time, the valve plate 13 is pushed by the electrode 23 acting on the raised portions 30 of the valve plate 13. In the preferred embodiment, positive air pressure is also introduced into the valve body 14 through passages 60 and 25 so that the lower half portion of the resilient body 17 is in sealing engagement with the inner surface 20 of the passage 15. The valve plate 13 is then fastened to the pin 21 as by bringing electrodes 22 and 23 into engagement with the pin 21 and the central portion 18 and by welding the valve plate 13 to the pin 21.

Thus, when the valve plate 13 is rotated about the axis of the pivot pin 21 to close the cylindrical passage, a sealing relationship between the periphery of the valve and surface 20 is insured. Furthermore, when the valve plate is rotated so as to be in substantially parallel position with respect to the axis of said cylindrical passage, the valve seat seal 63 is in engagement with the face seat 26 of the bypass passageway. Imperfect sealing engagement with the face seat 26 will not materially affect the function of the heater core and the comfort of the operator since there is usually an excess of water flow available through the heater core for adequate operator comfort. Leakage through the bypass port can be minimized by increasing the resiliency of the valve seat seal 63.

Although the invention has been described in connection with a liquid valve, it also has utility in other types of applications where fluid flow is controlled, or wherein a resilient seal is not provided on the periphery of the valve plate or wherein a resilient flow control orifice is not required. For example, as shown in the second embodiment in FIG. 4, the body 14' has a bypass port 24' with a passageway 25' projecting approximately midway into the cylindrical passage 15' and terminates in the cylindrical passage 15' with a face seat 26'. The passageway 15' is generally cylindrical except for two optional flat surfaces 41', 42' (not shown), one opposite the other, which is formed in the cylindrical passage 15' in spaced relationship downstream of the bypass port 24'. The body 14' is provided with a pivot pin 21' which is positioned transversely into the cylindrical passage 15' through the two flat surfaces 41', 42'. The valve plate 13' is made of metal, plastic or any other suitable material and has a corresponding central portion 18' that includes a flat planar portion 19' that forms an acute angle with the plane of the plate 16'. This planar portion also extends diametrically of the passage 15' when the valve 13' closes the cylindrical passage 15' and the two flat surfaces 50', 52' (not shown) on the valve 13' engage the respective flat surfaces 41', 42' in the passage 15'. When the valve plate is in parallel position with the axis of the cylindrical passage, the valve plate 13' engages the face seat 26' on the bypass passage.

The preferred embodiment is shown in FIG. 5 where all elements depicted are the same as in FIG. 2 except that the valve 13 is shown against face seat 26 to close off the bypass port passage 25.

Figure 7:
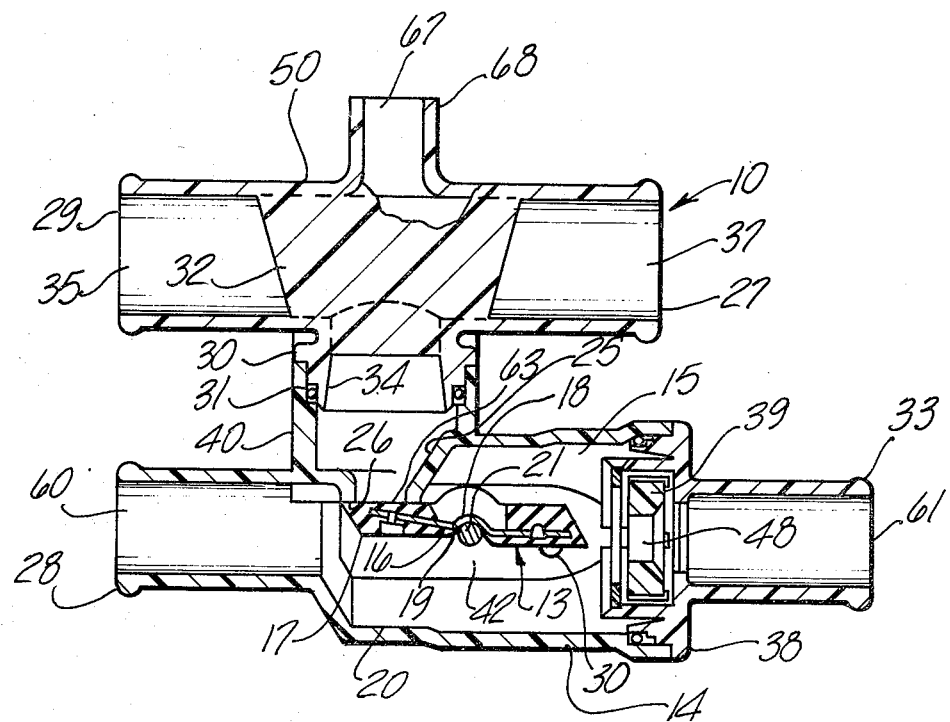
FIG. 7 is a third embodiment of the butterfly valve of the present invention.

A third embodiment of the butterfly valve is shown in FIG. 7 where all elements depicted are the same as FIG. 5 except that an additional port 68 has been incorporated into the bypass passage tee 24. The port 68 further has a passage 67 which interconnects with passages 35, 37, and 34 in the bypass passage tee 24. The port 24 accepts liquid from the engine intake manifold water jacket (not shown). The liquid is routed to the intake manifold water jacket in order to warm-up the intake fuel-air mixture to promote better engine combustion and to avoid fuel-air icing.

While the invention has been described in conjunction with specific embodiments thereof, it is evident that many alternatives, modifications and variations will be apparent to those skilled in the art, in light of the foregoing description. Accordingly, it is intended to embrace all such alternatives, modifications and variations as fall within the spirit and broad scope of the appended claims.

What I claim is:

1. A vacuum control valve assembly for regulating coolant flow in an automotive heating system comprising:

a housing having an opening therethrough, at least a portion of said opening defining a cylindrical passage;

a bypass passageway mounted to the side of said housing, one end of said passageway projecting into said opening in said housing;

a pivot pin mounted diametrically through said housing across said cylindrical passage in spaced relationship to said bypass passage;

a valve plate engaged to said pivot pin, said valve plate having a diametrically extending central flat planar portion which extends radially of said cylindrical passage when said valve plate is in inclined position with respect to the axis of said cylindrical passage and the periphery of said valve plate is in sealing engagement with the interior surface of said cylindrical passage whereby said valve plate stops the flow of fluid through said cylindrical passage and permits flow through said bypass passageway when said valve plate is in a first predetermined position and said valve plate restricts the flow of fluid through said bypass passageway and permits the flow of fluid through said cylindrical passage when said valve plate is in a second predetermined position;

means for restricting the flow of fluid through said bypass passageway when said valve plate is in parallel position with respect to the axis of said cylindrical passage and in proximate contact with said bypass passageway; and means for piloting said valve plate in said cylindrical passage of said housing such that said planar portion of said valve plate positioned centrally of said cylindrical passage whereby said piloting means locates said flat portion relative to said pin before said valve plate is fastened to said pin.

2. The control valve assembly according to claim 1 wherein said valve plate further comprising a resilient portion that engages said cylindrical passage when said plate is in position with the planar portion thereof extending radially of said cylindrical passage and the general plane thereof forming an acute angle with respect to the axis of said cylindrical passage.

3. The control valve according to claim 2 wherein substantially the entire valve plate except for said planar portion is embedded in resilient material.

4. The control valve according to claim 1 wherein said means for restricting further comprises:
a valve seat seal on the lower half upstream side of said valve plate; and
means for rotating said valve plate into parallel position with respect to the axis of said cylindrical passage and in proximate contact with said end of said bypass passageway.

5. The control valve according to claim 1 further comprising:
means for controlling the flow of fluid through said cylindrical passage downstream of said valve plate when said valve plate is not in sealing engagement with the interior surface of said passage.

6. The control valve according to claim 5 wherein said controlling means further comprises:
a flow control restriction member mounted in said cylindrical passage downstream of said valve plate.

7. The control valve according to claim 6 wherein said flow control restrictor member is a resilient orifice.

8. A vacuum control valve assembly for regulating liquid flow in an automotive heating system comprising:
a housing having an opening therethrough, at least a portion of said opening defining a cylindrical passage, said cylindrical passage having first and second flat parallel surfaces thereon;
a bypass passageway mounted to the side of said housing, one end of said passageway projecting into said opening in said housing;
a pivot pin mounted diametrically through said housing across said cylindrical passage in spaced relationship to said bypass passageway;
a valve plate engaged to said pivot pin, said valve plate having first and second flat parallel surfaces on the periphery of said valve plate, said valve plate further having a diametrically extending central flat planar portion which extends through said first and second flat parallel surfaces in said valve plate and extends radially of said cylindrical passage when said valve plate is in inclined position with respect to the axis of said cylindrical passage and the periphery of said valve plate is in sealing engagement with the interior surface of said cylindrical passage whereby said valve plate stops the flow of fluid through said cylindrical passage and permits flow through said bypass passageway when said valve plate is in a first predetermined position and said valve plate restricts the flow of fluid through said bypass passageway and permits the flow of fluid through said cylindrical passage when said valve plate is in a second predetermined position;
means for restricting the flow of fluid through said bypass passageway when said valve plate is in parallel position with respect to the axis of said cylindrical passage and in proximate contact with said bypass passageway;
means for piloting said valve plate in said cylindrical passage of said housing.

9. The control valve according to claim 8 wherein said valve plate has at least the peripheral portion thereof formed with a resilient material that engages the interior surface of said passage when said plate is in position with the planar portion thereof extending radially of said passage and the general plane thereof forming an acute angle with respect to the axis of said passage.

10. The control valve according to claim 8 wherein substantially the entire valve plate except for said planar portion is embedded in resilient material.

11. The control valve according to claim 8 wherein said means for restricting comprises:
a valve seat seal on the lower half upstream side of said valve plate; and
means for rotating said valve plate into parallel position with respect to the axis of said cylindrical passage and in proximate contact with said end of said bypass passageway so that the flow of liquid through said bypass passage is restricted.

12. The control valve according to claim 8 further comprising:
means for controlling the flow of fluid through said cylindrical passage downstream of said valve plate when said valve plate is not in sealing engagement with the interior surface of said passage.

13. The control valve according to claim 12 wherein said controlling means comprises:
a flow control restriction mounted in said cylindrical passage downstream of said valve plate.

14. The control valve according to claim 13 wherein said flow control restrictor is a resilient orifice.

15. The control valve according to claim 10 wherein said resiliently embedded valve plate further comprises first and second flat surfaces on the periphery of said valve plate in spaced relationship to where said pivot pin engages said valve plate, whereby said first and second flat surfaces on said valve plate engage said first and second flat surfaces on said cylindrical passageway to stop the flow of fluid through said cylindrical passage when said valve plate is in a first predetermined position.

16. A control valve assembly comprising:
a housing having an opening therethrough, at least a portion of said opening defining a cylindrical passage;
a bypass passageway mounted to the side of said housing, said passageway further having a projection which protrudes approximately midway into said cylindrical passage, said projection further having a face seat on its protruding end;
a pivot pin mounted diametrically through said housing across said cylindrical passage in spaced relationship to said face seat on said projection;
a metal valve plate engaged to said pivot pin, said valve plate having a diametrically extending central flat planar portion which extends radially of said cylindrical passage and perpendicular to the axis of said cylindrical passage when said valve plate is in inclined position with respect to the axis of said cylindrical passage whereby said valve plate stops the flow of fluid through said cylindrical passage and permits the flow of fluid through said bypass passageway when said valve plate is in a first predetermined position and said valve plate restricts the flow of fluid through said bypass passageway and permits the flow of fluid through said cylindrical passage when said valve plate is in the second predetermined position;

said valve plate having at least the peripheral portion thereof formed with a resilient material that engages the interior surface of said cylindrical passage when said planar portion is perpendicular to the axis of said cylindrical passage and the general plane of the valve plate forms an acute angle with respect to the axis of said cylindrical passage;

means for restricting the flow of fluid through said bypass passageway when said valve plate is in parallel position with respect to the axis of said cylindrical passage and in positional relationship to said face seat on said projection;

a resilient orifice mounted in said cylindrical passage so that the fluid downstream of said valve plate is restricted at a predetermined pressure level; and means for piloting said planar portion of said valve plate centrally of said cylindrical passage so that said piloting means locates said flat portion of said valve plate relative to said pin before said valve plate is fastened to said pin.

17. The control valve according to claim 16 wherein substantially the entire valve plate except for the planar position is embedded in resilient material.

18. The control valve according to claim 16 wherein said piloting means further comprises:

first and second flat surfaces on a predetermined portion of said cylindrical passageway in spaced relationship to said bypass passageway, said first flat surface located opposite said second flat surface; and said valve plate further comprises first and second flat surfaces on the periphery of said valve plate located perpendicular to said diametrical flat planar portion, said first flat surfaces located opposite said second flat surfaces, whereby said first and second flat surfaces on said valve plate engage said first and second flat surfaces on said cylindrical passageway to stop the flow of fluid through said cylindrical passageway when said valve plate is in a first predetermined position.

19. The control valve according to claim 16 further comprising:

motor means, connected to said pivot pin, for rotating said valve plate from a first predetermined position whereby said valve plate stops the flow of fluid through said cylindrical passage and permits the flow of fluid through said bypass passageway to a second predetermined position whereby said valve plate restricts the flow of fluid through said bypass passageway and permits the flow of fluid through said cylindrical passage.

20. The control valve according to claim 19 wherein said motor means comprises a vacuum actuated motor.

21. The combination as set forth in claim 19 wherein said motor means comprises an electric motor.

22. A control valve assembly for regulating coolant flow in an automotive heating system comprising:

a housing having a portion defining an opening therethrough, at least a portion of said opening defining a cylindrical passage;

a bypass passageway mounted to the side of said housing, said bypass passageway having one end projecting into said opening in said housing;

a pivot pin mounted diametrically through said cylindrical passage of said housing in spaced relationship to said bypass passageway;

a valve plate centrally mounted to said pivot pin for rotation therewith;

means for rotating said valve plate in said cylindrical passage from a first predetermined position, whereby the periphery of said valve plate contacts the interior surface of said cylindrical passage to restrict fluid flow therethrough and permits fluid flow through said bypass passageway, to a second predetermined position, whereby said valve plate contacts said one end of said bypass passageway so as to permit fluid flow through said cylindrical passage and restrict fluid flow through said bypass passageway; and means for piloting said valve plate in said cylindrical passage of said housing.

23. The control valve assembly as claimed in claim 22 further comprising:

means for restricting the flow of fluid through said cylindrical passage when said valve plate is in said second predetermined position.

24. The control valve assembly as claimed in claim 22 or 23 wherein said valve plate has a central flat planar portion extending radially of said cylindrical passage when said valve plate is in said first predetermined position and wherein the peripheral portion of said valve plate is formed with a resilient material which is contiguous with said cylindrical passage when said valve plate is in said first predetermined position.

25. The control valve assembly as claimed in claim 22 or 23 wherein said valve plate has a central flat planar portion extending radially of said cylindrical passage when said valve plate is in said first predetermined position and wherein substantially the entire valve plate except for said central planar portion is embedded in resilient material.

* * * * *

UNITED STATES PATENT AND TRADEMARK OFFICE
CERTIFICATE OF CORRECTION

PATENT NO. : 4,281,686
DATED : August 4, 1981
INVENTOR(S) : Gordon R. Gerlitz

It is certified that error appears in the above—identified patent and that said Letters Patent is hereby corrected as shown below:

Column 1, line 10, delete "959,643" insert ----959,743----.

Column 1, line 11, delete "4,202,398" insert ----4,273,157----.

Column 3, line 58, after "ultrasonic" delter the comma.

Column 8, line 2, after "passageway;" insert ----and----.

Signed and Sealed this

Seventeenth Day of November 1981

[SEAL]

Attest:

GERALD J. MOSSINGHOFF

*Attesting Officer*     *Commissioner of Patents and Trademarks*